No. 897,897. PATENTED SEPT. 8, 1908.
J. R. HECKMAN.
FISH TRAP.
APPLICATION FILED FEB. 27, 1908.
2 SHEETS—SHEET 1.
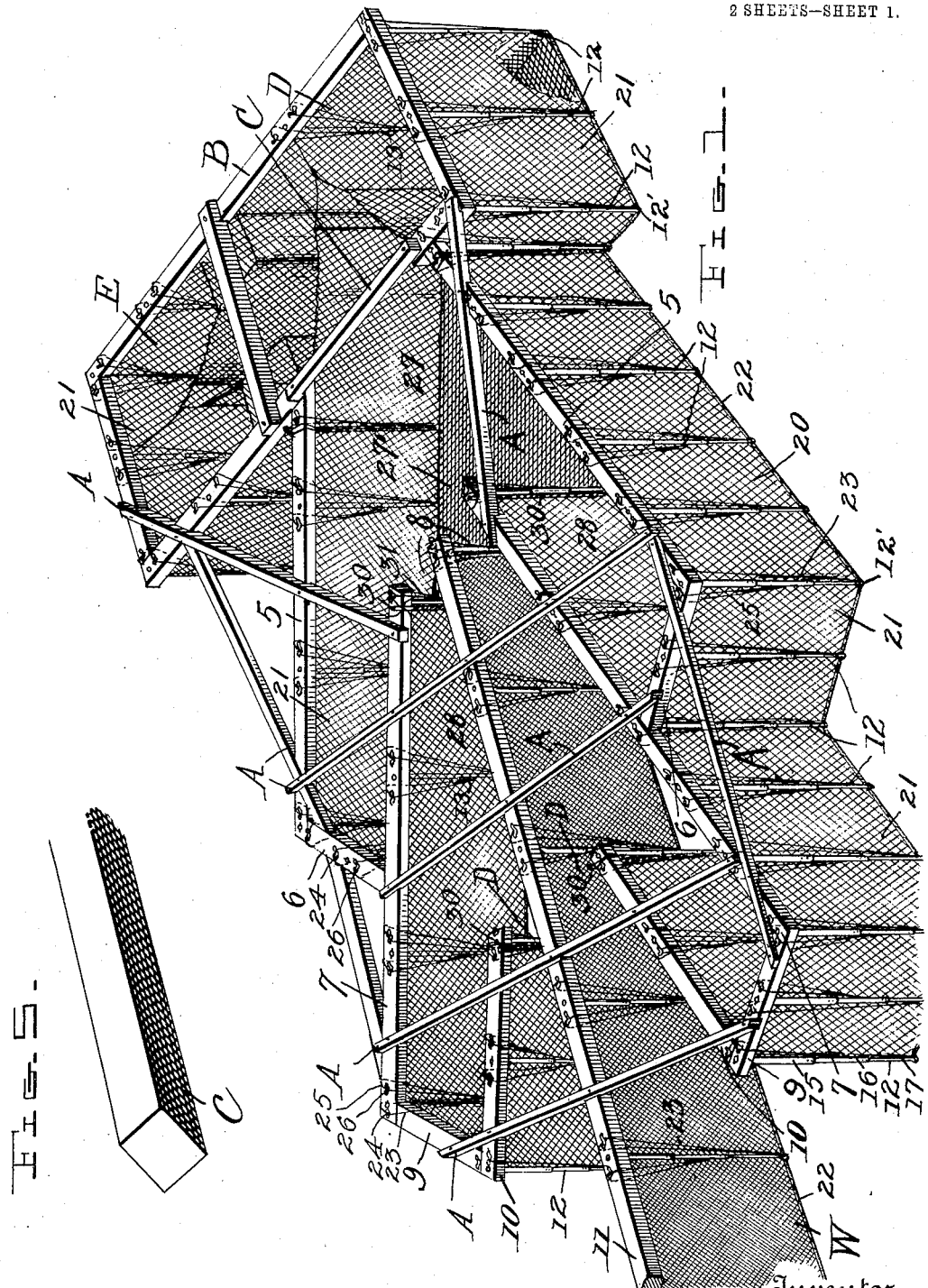
Witnesses
Inventor
J. R. Heckman
Woodward Chandler
Attorneys

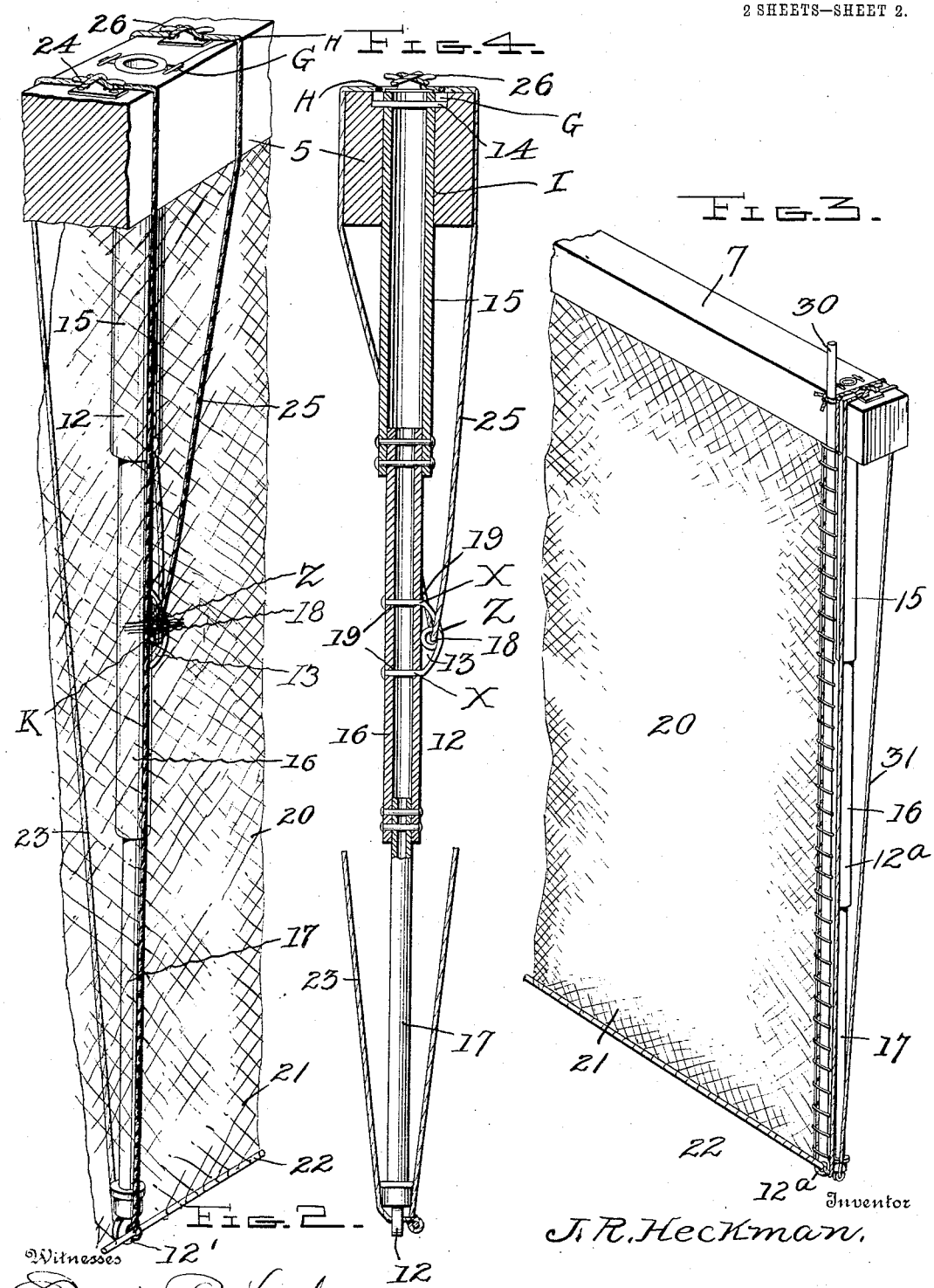

UNITED STATES PATENT OFFICE.

JAMES R. HECKMAN, OF KETCHIKAN, DISTRICT OF ALASKA.

FISH-TRAP.

No. 897,897.   Specification of Letters Patent.   Patented Sept. 8, 1908.

Application filed February 27, 1908. Serial No. 418,063.

*To all whom it may concern:*

Be it known that I, JAMES R. HECKMAN, a citizen of the United States, residing at Ketchikan, in the First Division and District of Alaska, have invented certain new and useful Improvements in Fish-Traps, of which the following is a specification.

This invention relates to traps, and more particularly to fish traps, and has for its object to provide a fish trap which may be employed in deep water, and which will be constructed and arranged to resist the action of currents and tides.

Another object is to provide a fish trap of such structure as to reduce the likelihood of alarming the fish to a minimum.

A further object is to provide a trap so arranged that the webbing thereof may be easily hauled down into position or raised, and in which the web moving elements will be simple.

A further object is to provide a structure including relatively few parts, and in which the various elements will be arranged to produce a strong and durable structure, and which, furthermore, will produce a trap which may be built at a relatively low figure.

Another object is to provide a trap which may be easily built on a beach or in the water and which may be easily transported from place to place.

Other objects and advantages will be apparent from the following description, and it will be understood that changes in the specific structure shown and described may be made within the scope of the claims, without departing from the spirit of the invention.

In the drawings forming a portion of this specification, and in which like numerals of reference indicate similar parts in the several views, Figure 1 is a perspective view of the complete trap. Fig. 2 is a detailed view showing the arrangement of the hauling down ropes and the web rod, Fig. 3 is a detailed view showing the construction at the sides of the openings of the trap and the method of attaching the webbing to the trap at these points, Fig. 4 is a section through one of the beams and a web rod connected therewith. Fig. 5 is a detail view showing the under side of one of the brace members.

Referring now to the drawings, the present trap comprises a floating frame consisting of two rearwardly divergent beams 5, having short inwardly extending beams 6 secured thereto at their rearward ends and at right angles thereto. Beams 7 similar to the beams 5 are secured between their ends to the inner ends of the short beams 6, extending parallel with the beams 5 and terminating short of the forward ends thereof. The beams 7 are thus forwardly convergent, and lie with their forward ends in spaced relation, to form an entrance 8, as will be later described. As shown, the beams 7 extend rearwardly beyond the beams 6, and have relatively short inwardly extending beams 9 secured at right angles thereto at their rearward ends. At their rearward ends these beams 9 have beams 10 secured at their ends thereto and extending inwardly and forwardly in parallel relation to the beams 7, these beams 10 lying with their inner forward ends in spaced relation, as shown.

The several beams are suitably braced by means of members A, disposed thereupon and mortised slightly thereinto, so that these members lie above the surface of the water when the trap is afloat. A longitudinally extending lead beam 11 is connected with the just described frame by means of certain of the brace members A, the lead beam extending between the forward ends of the beams 10, and lying with its forward extremity in the entrance 8, mentioned in the foregoing. As shown, the lead beam extends rearwardly to a considerable distance beyond the frame as usual.

The beams 5 lie with their forward ends in spaced relation and thereat are connected with a pot and spiller frame B. The beams 5 at their forward ends which form the entrance to the pot are connected by a brace member C, secured thereupon and thus lying above the surface of the water, and this brace member thus causes no ripple or agitation of the water which would tend to alarm the fish and prevent them from passing through the entrance to the pot, as later brought out. As shown, all portions of the frame occupy a substantially common horizontal plane, thus being arranged to float approximately at the surface of the water.

The several beams just described and the pot and spiller frame are provided with depending spaced web rods 12, each provided with an eyebolt 12' at its lower end, and with an eye member 13 of peculiar structure between its ends.

Each of the web rods 12 consists of a plurality of pipe sections, as shown. The uppermost sections are removably engaged through the beams of the trap frame and have pins 14 removably engaged through their upper ends to hold them in the frame beams. These uppermost sections are indicated at 15, and engaged in the lower end portion of each of these sections 15, there is a somewhat smaller intermediate section 16, having a lower and yet smaller section 17 engaged within its lower end. The several sections are secured together, the mutually engaging portions being overlapped to a sufficient extent to give the required strength to the rods. By this structure, web rods are provided which have their greatest strength at their upper portions joining the frame beams, these upper portions of course receiving the greatest stress incident to the tendency of the web rods to bend or break from the beams as a result of the pressure of water against the web rods themselves, and against the web carried by rods as subsequently disclosed. The lower portions of the rods, receiving less stress, are sufficiently strong when made of the smaller pipe as just described.

The eye members 13 of the several web rods are carried by the intermediate sections 16 of the rods and these members are each formed of a metallic rod bent into yoke shape to present a bight Z and spaced legs X. The bight Z of each of these yokes is given a half turn and looped at its center, to present an eye 18 lying between the legs X.

In attaching the eye members 13 to the sections 16 of the web rods, the legs X of the yokes are passed through openings 19 formed in the sections 16 of the web rods, and are riveted at their ends to hold them in position. When thus attached, the eyes 18 are directed toward the web rods, as will be seen from the drawings, and the curved portions of the bight Z of the yokes act as guides to direct the edge of the net web over the eyes as will be subsequently described.

The net web indicated at 20 is secured at its upper edge to the various beams of the frame, and includes vertical wall portions 21, as shown, it being understood that these portions 21 are the parts of the web which are attached to the beams. At the lower edges of the portions 21, there is the usual strengthening rope 22, to which may be attached continuous web-setting ropes which I shall term "full haul downs" 23. One of these haul downs is provided for each of the web rods 12, and is engaged through the bottom eyebolt 12' of its web rod, these haul downs being looped over cleats 24 secured upon the beams of the frame adjacent to the web rods. It will thus be seen that when it is desired to set the web, it is but necessary to haul upon one side of each of the haul downs 23, which will cause the other side thereof to move downwardly and therewith the lower edge of the wall portion of the web, until this edge has reached its lowermost limit of movement and the web is taut. The haul down may then be wrapped upon the cleat to hold the web in position. The web may be raised in the reverse manner as will be understood.

To lessen the stress upon the various parts incident to hauling down the full weight of the web by means of the full haul down 23, a half haul down 25 is provided for each web rod and is in the form of a continuous rope engaged through the eye 18 and also engaged around a cleat 26 mounted upon the frame-beams. This half haul down 25 is secured at one point to approximately the central portion of the web as shown at K and may be operated in a manner similar to the just described operation of the haul downs 23 to bring the upper portion of the web taut and hold its central portion to the web rod. As described in the foregoing, the arrangement of the eye members 13 which provides the guides formed by the curved portions of the bight Z, prevents the edge of the net web from engaging the eye and thus having its progress impeded.

It will of course be understood that the depending wall portions 21 of the web are carried by the various beams of the frame, shown in the drawings.

The inclosure formed by the portion of the web carried by the parallel beams 5 and 7 and 6, forms what will be termed the heart 27 of the trap and this heart is provided with a bottom web 27'. The portions of the web which are carried by the beams 7, 9 and 10, form what is termed the jigger 28, this jigger being without a bottom web, as shown. The pot and spiller are formed by the portions of the web carried by the frame B, and are provided with bottom webs in the usual manner.

The portion of the net web carried by the lead beam 11 forms what is known as the lead, and is indicated at W. It will thus be seen that fish following the lead are free to enter the jigger through the space between the lead and the inner ends of the webs carried by the beams 10, these beams 10 having their inner ends spaced as shown in the drawing.

In operation, the trap is floated in the water, the buoyancy of the rigid frame being sufficient to hold it floating at the surface of the water, and with the brace members above the surface of the water, as brought out in the foregoing.

It will be seen that fish swimming against the lead W will have their progress impeded thereby, and will at once make for deep water. It will of course be understood that the trap is disposed with its forward end towards deep water. Passing along the lead web, the fish will pass through the entrance to the jigger, indicated at D, this entrance being of such width as to reduce the likelihood of alarming fish to a minimum. Following the lead indicated at W, the fish will reach the entrance 8 leading to the heart 27, but this entrance being somewhat smaller, the fish are likely to be frightened away, and it is to prevent the escape of fish thus frightened that the jigger 28 is provided.

It is a known fact that salmon and similar varieties of fish, for the capture of which the present trap is especially designed, never retrace their courses, so that upon becoming frightened at the entrance 8 to the heart, they would veer away from the lead web and would strike that portion of the web 20 which is connected with the beams 7. Following this portion of the web, they will reach that portion which is carried by the beams 9, and will be turned rearwardly and then inwardly. They will then strike the portion of the web carried by beams 10 and will be again deflected against the lead W. Their tendency then will be to dodge through the opening and into the heart 27, from which they will pass into the pot indicated at D, and into the spiller shown at E.

As shown in the drawings, the guide web W is of finer mesh than the web 20, so that when salmon are feeding upon herring and other small fish, the latter will also be directed into the trap, the salmon following. After the salmon have been caught in the trap, the herring will be free to pass therefrom through the larger mesh of the web so that destruction of small fish is prevented.

As will be observed, there are no transverse connecting members at the forward end of the member 7, which lie at the entrance 8 to the heart, which might cast a reflection upon the water and thus tend to frighten the fish. All transverse members are in the nature of the small brace member A, and these are elevated above the surface of the water as mentioned in the foregoing, and have their under surfaces painted a color to prevent the reflection of light against the surface of the water. The same is true of the brace member C, as before stated and there is thus no element disposed in a position to frighten the fish.

At the inner ends of the beams 10, 7 and 5, web rods are provided of a structure illustrated in Fig. 3. These web rods are indicated at 12ª, and are without the eye member 13.

In attaching the free ends of the wall portions 21 of the web at these web rods 12ª, vertically extending members 30 are provided, which are in the form of poles or rods, each having its lower end secured to the haul down 31 as indicated in Fig. 3. By means of this haul down it is thus possible to bring the member 30 into a position to lie with its lower end at the lower end of the web rod 12ª, and extending vertically against the web rod.

In setting these end portions of the web, the lower edge portion of the web is lashed to the lower portion of the member 30. This portion of the member is then drawn downwardly into the water, and as the operation progresses the web is lashed to the member until the latter is drawn into the water, and the full length of the web rod at its end is lashed to the member when the latter will have been brought into position to hold the end of the web against the web rod 12ª.

As shown in the drawings, the web rods 12 are removably engaged in the frame beams, they being held in position by the pins 14, and it is thus possible to remove the web rods from the frame beams with ease and speed when it is desired to move the trap from place to place. By removing the web rods, practically all resistance to the movement of the trap through the water is removed, as, with the weight of the web rods removed the frame floats practically upon the surface of the water, and furthermore the removal of the web rods makes it possible to tow the frame through shallow water of insufficient depth to permit of the passage of the trap therethrough were the rods left in position.

It will also be seen that the present trap may be built in the water by attaching the various frame beams and braces together while they are floating in the water, and that the web rods may then be thrown into the water, suitable cables being attached thereto, and may then be drawn into position to introduce their upper ends through the openings in the frame beams, after which they are secured in position by the pins 14.

It will be understood that while I use the term "rope" in the specification and in the claims to describe the haul down and similar portions of the invention, I do not desire to be limited to the use of rope in the narrow sense of the term, as I may of course employ cables or chains or any other suitable flexible members for the purpose.

The removable engagement of the web rods 12 in the frame beams is effected by the disposal of the upper end portions of the web rods in the vertical passages I formed through the beams, and formed in the upper surfaces of the beams there are lateral recesses G which receive the end portions of the pins 14, thus preventing rotation of the web rods in the beams. Upward movement of the web rods through the passages I is prevented by removable staples H engaged over the recesses G.

What is claimed is:

1. In a fish trap structure, the combination with a rigid buoyant frame including a plurality of floatable members all occupying a substantially common plane, of depending web supporting members secured to the frame.

2. In a structure of the class described, the combination with a buoyant frame consisting of a plurality of floatable members occupying a substantially common plane, of separate nonbuoyant depending web supporting members carried by the frame.

3. In a fish trap structure, the combination with a buoyant supporting member, of a depending member carried by the supporting member, a continuous rope movably engaged with the lower portion of the depending member, a second rope movably engaged with the depending member above the first named rope, and a net web secured to the ropes.

4. In a fish trap structure, the combination with a supporting member of a depending member carried by the supporting member said depending member having vertically spaced eyes, flexible members movably engaged in the eyes and a net web secured to the flexible members.

5. In a fish trap, the combination with a buoyant supporting frame, of a depending web supporting member carried by the frame, a web secured to the frame and movable vertically over the web supporting member, a rope slidably connected with the lower end of the web supporting member, said rope being secured to the lower portion of the web, an eye member carried by the web supporting member and extending laterally therefrom between the ends of said web supporting member, a second rope slidably engaged through the eye member, said second rope being secured to the web above the lower portion thereof, said eye member including means for guiding the lower edge of the web thereover when the web is moved downwardly.

6. In a fish trap structure, the combination with buoyant frame members, of brace members superposed on said frame members to lie above the surface of a liquid in which the frame members may be floated.

7. In a fish trap structure, the combination with a frame adapted to float at the surface of the water, a net web carried by the frame and having portions spaced to form an entrance said frame including members lying at opposite sides of said entrance, and a member secured to the first named members of the frame at opposite sides of the entrance and adapted to lie above the surface of the water in which the frame is floated.

8. In a fish trap structure, the combination with a buoyant frame, of a depending web rod carried by the frame, a flexible member slidably engaged with the lower end of said web rod, a member secured to the flexible member, and arranged to lie in operative position in substantially parallel relation to the web rod, and a web secured to said second named member, said flexible member being adapted for movement with respect to the web rod to bring the second named member into and out of operative position.

9. In a fish trap structure, the combination with a buoyant frame, of depending web supporting members removably engaged in the frame.

10. In a fish trap structure, the combination with a frame, of depending web supporting members carried by the frame, said web supporting members comprising a plurality of sections engaged one within another.

11. In a fish trap structure the combination with a frame including rearwardly divergent pairs of parallel beams, the inner beam of each pair extending outwardly beyond the corresponding outer beam, of connecting beams secured to the beams of each pair, inwardly extending beams secured to the outermost ends of the inner divergent beams, forwardly convergent beams secured to the inner ends of said inwardly extending beams, a lead beam disposed between the forwardly convergent beams and with its forward end between the forward ends of the inner divergent beams, and depending webbing connected with the beams.

12. A fish trap comprising a heart including side walls and a bottom, said side walls having an entrance therein, a lead arranged to direct fish through the said entrance, and a bottomless jigger arranged to direct fish veering from the entrance again against the lead.

13. In a frame for fish traps, the combination with buoyant surface beams disposed in spaced relation to form a trap entrance, of a connecting member secured to the beams in position to extend across the entrance and in position to lie above the surface of the water in which the beams are floated, said connecting member being treated to prevent the reflection of light therefrom against the surface of the water.

14. In a fish trap structure, the combination with a floating frame beam having a passage formed therethrough and having lateral recesses communicating with the passage, of a depending web supporting member removably engaged in the passage, and a transverse pin removably engaged in the web supporting member and lying with its ends in the recesses.

In testimony whereof I affix my signature, in presence of two witnesses.

JAMES R. HECKMAN.

Witnesses:
W. E. CHANDLER,
Z. M. DOOLEY.